(12) United States Patent
Kelley et al.

(10) Patent No.: US 12,731,430 B2
(45) Date of Patent: Sep. 8, 2026

(54) SYSTEMS FOR GENERATING PRESENTATIONS OF EYEBROW DESIGNS

(71) Applicant: L'Oreal, Paris (FR)

(72) Inventors: Maya Kelley, San Francisco, CA (US); Mehdi Doumi, North Plainfield, NJ (US); Fred Orsita, New York, NY (US)

(73) Assignee: L'Oreal, Paris (FR)

( * ) Notice: Subject to any disclaimer, the term of this patent is extended or adjusted under 35 U.S.C. 154(b) by 1051 days.

(21) Appl. No.: 17/895,022

(22) Filed: Aug. 24, 2022

(65) Prior Publication Data

US 2023/0066846 A1 Mar. 2, 2023

Related U.S. Application Data

(60) Provisional application No. 63/238,622, filed on Aug. 30, 2021.

(30) Foreign Application Priority Data

Nov. 5, 2021 (FR) ...................................... 2111759

(51) Int. Cl.
*G06T 19/00* (2011.01)
*G02B 27/01* (2006.01)

(52) U.S. Cl.
CPC ........ *G02B 27/0172* (2013.01); *G06T 19/006* (2013.01); *G02B 2027/0138* (2013.01); *G02B 2027/0187* (2013.01)

(58) Field of Classification Search
None
See application file for complete search history.

(56) References Cited

U.S. PATENT DOCUMENTS 8,505,552 B1 * 8/2013 Soare ..................... A45D 40/30 132/319
9,232,847 B2 * 1/2016 Soare ..................... A45D 44/00
(Continued)

FOREIGN PATENT DOCUMENTS

JP 2015121841 A 7/2015
JP 2021069602 A 5/2021

OTHER PUBLICATIONS

Aedot, "Show Your Patients a Real Life Picture of What They'll Look Like After A Cosmetic Procedure", Jun. 22, 2021, URL: https://web.archive.org/web/20210622174156/https://aedit.com/white-label-the-aeditor (Year: 2021).*
(Continued)

*Primary Examiner* — David H Chu
(74) *Attorney, Agent, or Firm* — Christensen O'Connor Johnson Kindness PLLC

(57) ABSTRACT

In some embodiments, a computer-implemented method of presenting an achievable eyebrow is provided. A computing system receives an indication of an eyebrow mimetic for a subject. The computing system positions the eyebrow mimetic on an image of a face of the subject. The computing system determines an achievable eyebrow by determining one or more modifications to a bare eyebrow of the subject within maximum modification parameters to make the bare eyebrow more like the eyebrow mimetic. The computing system generates a presentation of the achievable eyebrow.

18 Claims, 8 Drawing Sheets

(56) References Cited

U.S. PATENT DOCUMENTS

| | | | | |
|---|---|---|---|---|
| 2015/0189968 | A1* | 7/2015 | Soare | A45D 26/00 132/200 |
| 2016/0125229 | A1* | 5/2016 | Soare | G06T 7/001 382/118 |
| 2017/0119471 | A1* | 5/2017 | Winner | G06T 19/006 |
| 2018/0075524 | A1* | 3/2018 | Sartori Odizzio | G06T 11/001 |
| 2018/0092453 | A1* | 4/2018 | Shimley | A45D 40/26 |
| 2018/0332949 | A1* | 11/2018 | Soare | A45D 44/00 |
| 2019/0117379 | A1* | 4/2019 | Quirós | A61F 2/12 |
| 2019/0191850 | A1* | 6/2019 | Yoganandan | B26B 21/4056 |
| 2020/0126314 | A1* | 4/2020 | Powers | G06T 19/20 |

OTHER PUBLICATIONS

Berich, "The world's first makeup printer has arrived", 2019, URL: https://www.professionalbeauty.com.au/beauty/the-worlds-first-makeup-printer-has-arrived/ (Year: 2019).*

Written Opinion and Search Report mailed Jun. 13, 2022, issued in corresponding French Application No. FR 2111759, filed Nov. 5, 2021, 6 pages.

Khabarlak, K.S., et al., "Fast Facial Landmark Detection and Applications: A Survey," Journal of Computer Science & Technology, vol. 22, No. 1, 2022, 20 pages.

Zheng, X., et al. "A Survey to Deep Facial Attribute Analysis," arxiv.org, Cornell University Library, 201 Olin Library Cornell University Ithaca, NY 14853, Dec. 26, 2018, 30 pages.

Wang X., et al., "A Survey on Face Data Augmentation," arxiv.org, Cornell University Library, 201 Olin Library Cornell University Ithaca, NY 14853, Apr. 26, 2019, 26 pages.

Portenier, T., et al., "Faceshop: Deep Sketch-based Face Image Editing," ACM Transactions on Graphics, vol. 37, No. 4, Jul. 30, 2018, 13 pages.

Guo, D., et al., "Digital Face Makeup by Example," 2017 IEEE Conference On Computer Vision And Pattern Recognition (CVPR), Jan. 1, 2009, 7 pages.

Anthropics Technology Ltd: "Portrait Pro User Manual Version 21.0," URL:https://www.anthropics.com/portraitpro/downloads/PortraitPro21_Win_Manual.pdf, Jan. 1, 2020, 6 pages.

Office Action mailed Dec. 2, 2024, in corresponding Japanese application No. 2024-513437, filed Aug. 24, 2022, 17 pages.

International Search Report and Written Opinion mailed Nov. 22, 2022, , issued in corresponding International Application No. PCT/US2022/041428, filed Aug. 24, 2022, 12 pages.

Yalcinkaya, E., et al., "Aesthetic analysis of the ideal eyebrow shape and position," European Archives of Oto-Rhino-Laryngology, vol. 273, No. 2, Oct. 28, 2014, pp. 305-310.

Hamamoto, A., et al., "Identifying Ideal Brow Vector Position: Empirical Analysis of Three Brow Archetypes," Facial Plastic Surgery, vol. 29, No. 01, Jan. 1, 2013,pp. 76-81.

Office Action mailed Jun. 23, 2025, in corresponding Korean application No. 1020247004527, filed Aug. 24, 2022, 16 pages.

Office Action mailed Nov. 24, 2025, in corresponding European application No. 22765972.9, filed Aug. 24, 2022, 23 pages.

Office Action mailed Feb. 25, 2026, in corresponding Korean application No. 1020247004527, filed Aug. 24, 2022, 6 pages.

Office Action mailed May 1, 2026, in corresponding Chinese application No. 202280053447.8, filed Aug. 24, 2022, 20 pages.

* cited by examiner

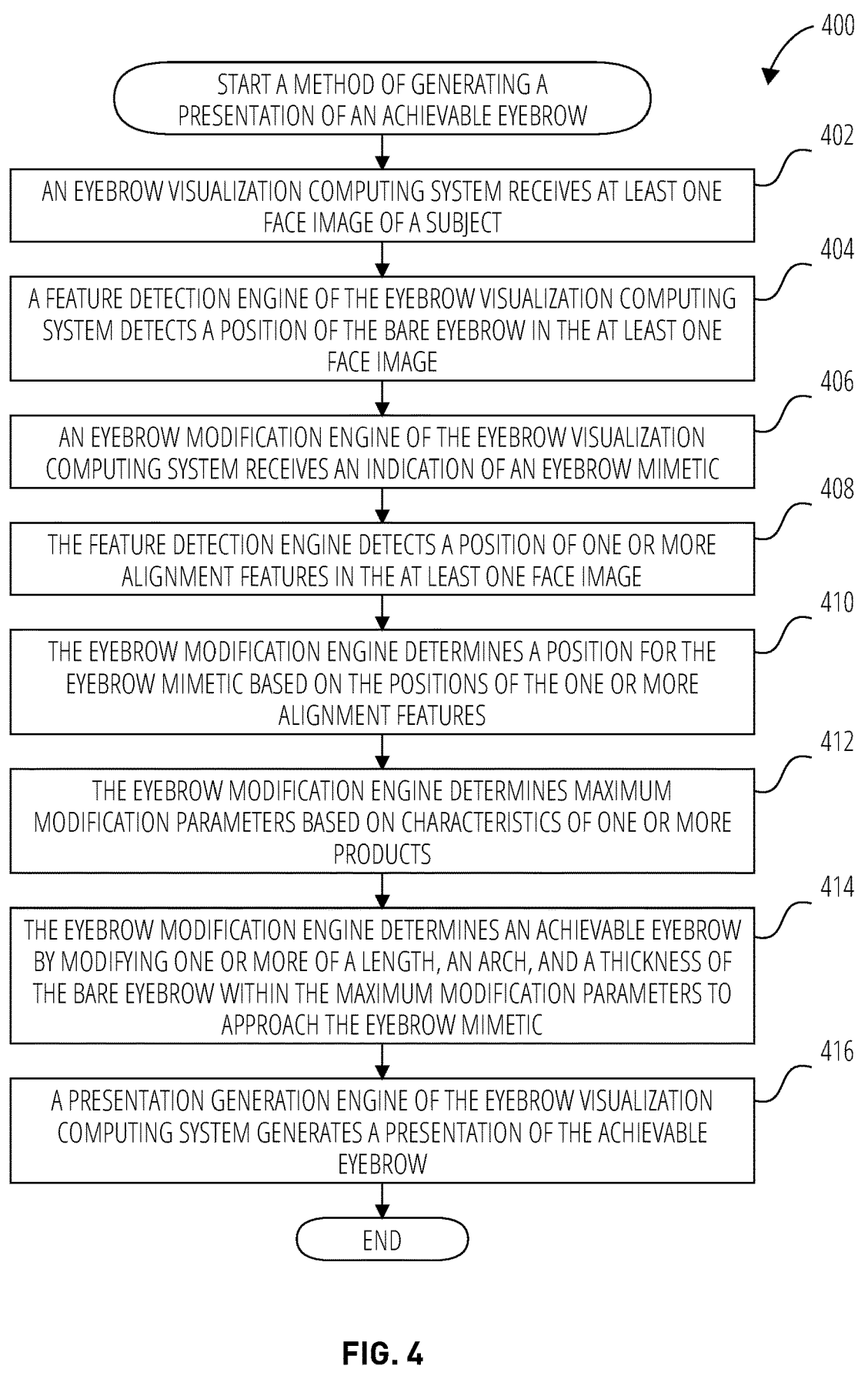

400

START A METHOD OF GENERATING A PRESENTATION OF AN ACHIEVABLE EYEBROW

402 AN EYEBROW VISUALIZATION COMPUTING SYSTEM RECEIVES AT LEAST ONE FACE IMAGE OF A SUBJECT

404 A FEATURE DETECTION ENGINE OF THE EYEBROW VISUALIZATION COMPUTING SYSTEM DETECTS A POSITION OF THE BARE EYEBROW IN THE AT LEAST ONE FACE IMAGE

406 AN EYEBROW MODIFICATION ENGINE OF THE EYEBROW VISUALIZATION COMPUTING SYSTEM RECEIVES AN INDICATION OF AN EYEBROW MIMETIC

408 THE FEATURE DETECTION ENGINE DETECTS A POSITION OF ONE OR MORE ALIGNMENT FEATURES IN THE AT LEAST ONE FACE IMAGE

410 THE EYEBROW MODIFICATION ENGINE DETERMINES A POSITION FOR THE EYEBROW MIMETIC BASED ON THE POSITIONS OF THE ONE OR MORE ALIGNMENT FEATURES

412 THE EYEBROW MODIFICATION ENGINE DETERMINES MAXIMUM MODIFICATION PARAMETERS BASED ON CHARACTERISTICS OF ONE OR MORE PRODUCTS

414 THE EYEBROW MODIFICATION ENGINE DETERMINES AN ACHIEVABLE EYEBROW BY MODIFYING ONE OR MORE OF A LENGTH, AN ARCH, AND A THICKNESS OF THE BARE EYEBROW WITHIN THE MAXIMUM MODIFICATION PARAMETERS TO APPROACH THE EYEBROW MIMETIC

416 A PRESENTATION GENERATION ENGINE OF THE EYEBROW VISUALIZATION COMPUTING SYSTEM GENERATES A PRESENTATION OF THE ACHIEVABLE EYEBROW

END

FIG. 4

SYSTEMS FOR GENERATING PRESENTATIONS OF EYEBROW DESIGNS

CROSS REFERENCE TO RELATED APPLICATION

This application claims the benefit of Provisional Application No. 63/238,622, filed Aug. 30, 2021. This application also claims priority to French Application No. 2111759, filed Nov. 5, 2021. The entire disclosures of both applications are hereby incorporated by reference herein for all purposes.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a eyebrow generation system is provided. The system includes circuitry configured to predict static and dynamic information of a brow region of a subject and to determine one or more eyebrow characteristic for a subject based on one or more images or videos of the brow region of the subject; circuitry configured to generate one or more digital instances of an eyebrow geometric shape, an eyebrow color, an eyebrow texture, or an eyebrow location based on the static and dynamic information of the brow region; and circuitry configured to generate one or more digital instances of user-selectable modifications to the eyebrow geometric shape, the eyebrow color, the eyebrow texture, or the eyebrow location.

In some embodiments, a computer-implemented method of presenting an achievable eyebrow is provided. A computing system receives an indication of an eyebrow mimetic for a subject. The computing system positions the eyebrow mimetic on an image of a face of the subject. The computing system determines an achievable eyebrow by determining one or more modifications to a bare eyebrow of the subject within maximum modification parameters to make the bare eyebrow more like the eyebrow mimetic. The computing system generates a presentation of the achievable eyebrow.

In some embodiments, a non-transitory computer-readable medium having instructions stored thereon is provided. The instructions, in response to execution by one or more processors of a computing system, cause the computing system to perform actions including receiving, by the computing system, an indication of an eyebrow mimetic for a subject; positioning, by the computing system, the eyebrow mimetic on an image of a face of the subject; determining, by the computing system, an achievable eyebrow by determining one or more modifications to a bare eyebrow of the subject within maximum modification parameters to make the bare eyebrow more like the eyebrow mimetic; and generating, by the computing system, a presentation of the achievable eyebrow.

In some embodiments, a system is provided that includes circuitry for receiving an indication of an eyebrow mimetic for a subject; circuitry for positioning the eyebrow mimetic on an image of a face of the subject; circuitry for determining an achievable eyebrow by determining one or more modifications to a bare eyebrow of the subject within maximum modification parameters to make the bare eyebrow more like the eyebrow mimetic; and circuitry for generating a presentation of the achievable eyebrow.

BRIEF DESCRIPTION OF THE DRAWINGS

FIG. 4 is a flowchart that illustrates a non-limiting example embodiment of a method of generating a presentation of an achievable eyebrow according to various aspects of the present disclosure.

The foregoing aspects and many of the attendant advantages of this invention will become more readily appreciated as the same become better understood by reference to the following detailed description, when taken in conjunction with the accompanying drawings.

DETAILED DESCRIPTION

One common application of cosmetic products is to augment the appearance of the eyebrow. Typically, brushes, pencils, powders, waxes, and/or mascara are used to fill in areas around an untreated eyebrow (or "bare eyebrow") to attain a desired eyebrow shape. Sometimes, concealer or tweezing may be used to make some portions of the bare eyebrow smaller to attain the desired eyebrow shape, but most changes are created by applying a product to increase the dimensions of the bare eyebrow.

While some dramatic changes in the appearance of a bare eyebrow can be created, it is possible to go too far. People may often try to sculpt their bare eyebrow to appear more like the eyebrow of a celebrity, a model, or other eyebrows, but it has been found that, depending on the products used, attempting to change the size or shape of the bare eyebrow too much can lead to an eyebrow that looks unnatural. Further, how much a bare eyebrow can be changed is not intuitive, and determining maximum changes to a bare eyebrow without looking unnatural by trial-and-error is time consuming, wastes product, and may be beyond the skill of the average person. What is desired are automated techniques that can determine an achievable eyebrow based on an eyebrow mimetic that can be attained by applying cosmetic products to a bare eyebrow of a subject without appearing unnatural, as well as techniques for presenting the achievable eyebrow to the subject.

Figure 1:
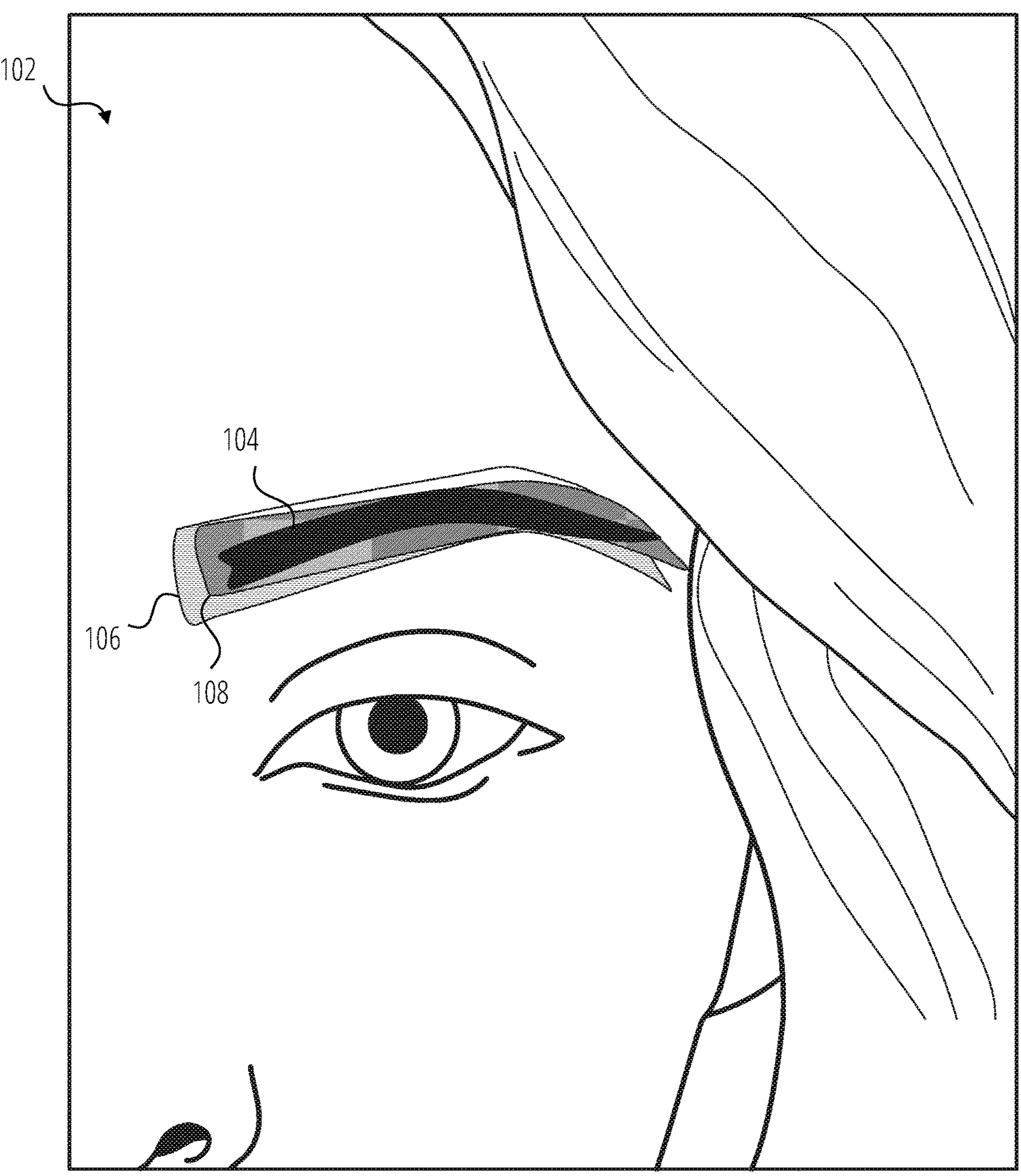
FIG. 1 is an illustration of a portion of a face of a subject according to aspects of the present disclosure.

FIG. 1 is an illustration of a portion of a face of a subject according to various aspects of the present disclosure. The view of the face of the subject 102 shown in FIG. 1 may be a selfie image or video captured by the subject 102 (or a portion thereof), an image or video of the subject 102 captured by a third party, or simply a drawing of the subject 102 to illustrate the concepts discussed above. In the illustration, a bare eyebrow 104 of the subject 102 is visible, and is illustrated in solid black.

The subject 102 may want to have their eyebrow appear more like an eyebrow mimetic 106, which is illustrated with horizontal hashing. However, the eyebrow mimetic 106 is significantly larger than the bare eyebrow 104, and filling in the intervening space with a given cosmetic product (or combination of products) would likely look unnatural due to the large difference between the bare eyebrow 104 and the eyebrow mimetic 106. Accordingly, embodiments of the present disclosure determine an achievable eyebrow 108, which is illustrated with diagonal hashing between the bare eyebrow 104 and the eyebrow mimetic 106. The achievable eyebrow 108 is determined using characteristics of the cosmetic products regarding how far the cosmetic products can extend the bare eyebrow 104 without looking unnatural, and is presented by embodiments of the present disclosure. Further details regarding how the achievable eyebrow 108 is determined and presented are provided below.

Figure 2:
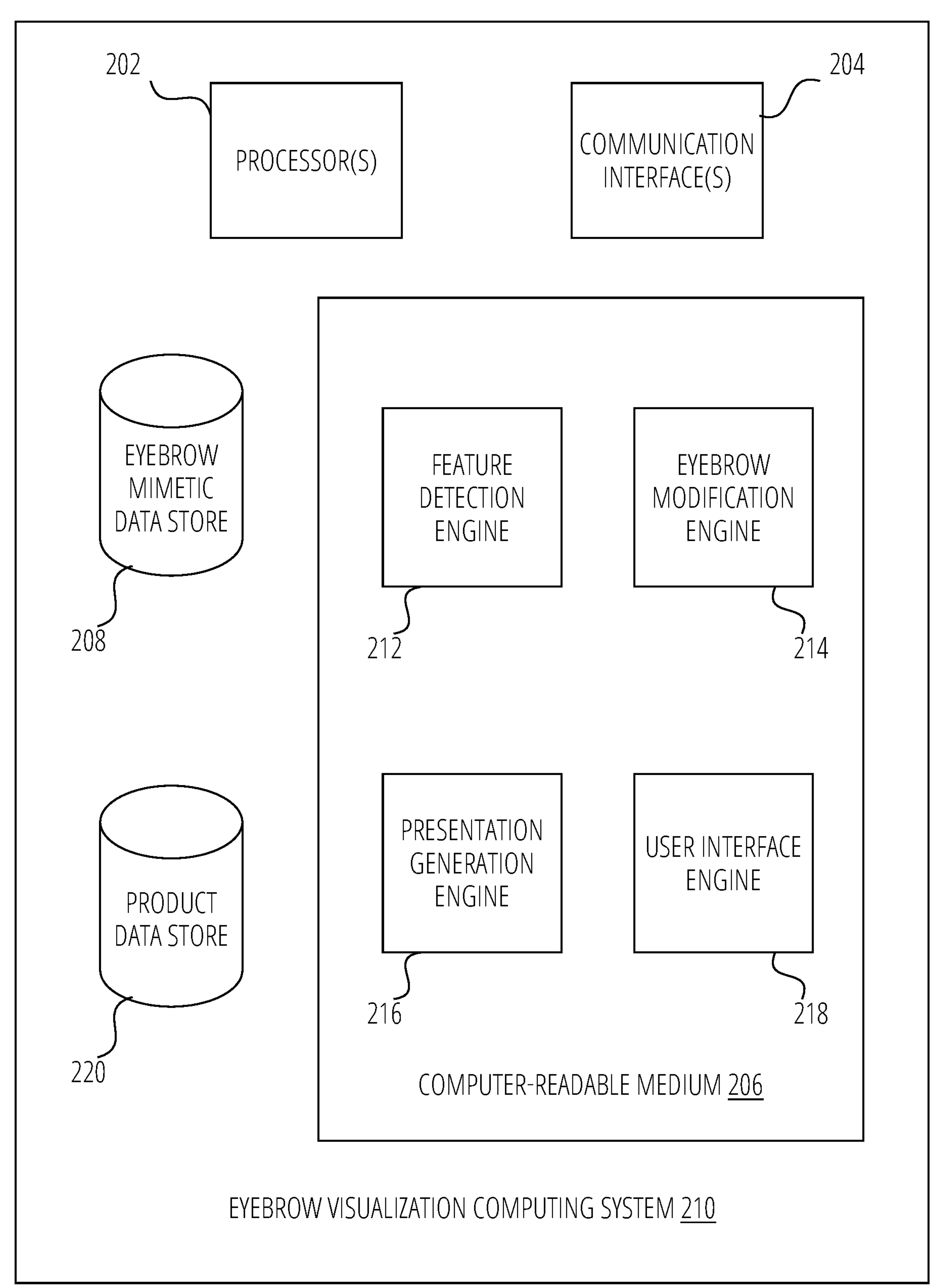
FIG. 2 is a block diagram that illustrates aspects of a non-limiting example embodiment of an eyebrow visualization computing system according to various aspects of the present disclosure.

FIG. 2 is a block diagram that illustrates aspects of a non-limiting example embodiment of an eyebrow visualization computing system according to various aspects of the present disclosure. The illustrated eyebrow visualization computing system 210 may be implemented by any computing device or collection of computing devices, including but not limited to a desktop computing device, a laptop computing device, a mobile computing device, a server computing device, a computing device of a cloud computing system, and/or combinations thereof. The eyebrow visualization computing system 210 is configured to determine achievable eyebrows for subjects and to generate presentations of the achievable eyebrows.

As shown, the eyebrow visualization computing system 210 includes one or more processors 202, one or more communication interfaces 204, an eyebrow mimetic data store 208, a product data store 220, and a computer-readable medium 206.

In some embodiments, the processors 202 may include any suitable type of general-purpose computer processor. In some embodiments, the processors 202 may include one or more special-purpose computer processors or AI accelerators optimized for specific computing tasks, including but not limited to graphical processing units (GPUs), vision processing units (VPTs), and tensor processing units (TPUs).

In some embodiments, the communication interfaces 204 include one or more hardware and or software interfaces suitable for providing communication links between components. The communication interfaces 204 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof.

As shown, the computer-readable medium 206 has stored thereon logic that, in response to execution by the one or more processors 202, cause the eyebrow visualization computing system 210 to provide a feature detection engine 212, an eyebrow modification engine 214, a presentation generation engine 216, and a user interface engine 218.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

In some embodiments, the feature detection engine 212 is configured to detect features in two-dimensional and/or three-dimensional face images, such as bare eyebrows and alignment features, using various computer vision techniques. The feature detection engine 212 may also be configured to build three-dimensional representations of the face images in order to generate more accurate results. In some embodiments, the eyebrow modification engine 214 is configured to determine changes to a bare eyebrow detected by the feature detection engine 212 that would look realistic given one or more selected cosmetic products to be used. Characteristics of various cosmetic products may be stored in the product data store 220. In some embodiments, the presentation generation engine 216 is configured to generate one or more various types of presentations of an achievable eyebrow determined by the eyebrow modification engine 214.

In some embodiments, the user interface engine 218 is configured to receive input from a subject (or other user) to be provided to other components of the eyebrow visualization computing system 210. For example, the user interface engine 218 may present various eyebrow mimetics stored in the eyebrow mimetic data store 208, and may receive a selection of an eyebrow mimetic from the subject (or other user). In some embodiments, the eyebrow mimetics may be bitmaps, meshes, and/or other representations of observed eyebrows of celebrities, models, or other people, and may be presented by the user interface engine 218 as sample images of the other people for selection. In some embodiments, the user interface engine 218 may present a questionnaire, and may determine a template with a certain style (angular, round, etc.), texture, and color for an eyebrow mimetic based on the questionnaire results. In some embodiments, the eyebrow mimetic may be determined using a recommendation algorithm based on facial feature analysis.

Further description of the configuration of each of these components is provided below.

As used herein, "engine" refers to logic embodied in hardware or software instructions, which can be written in one or more programming languages, including but not limited to C, C++, C#, COBOL, JAVA™, PHP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 3:
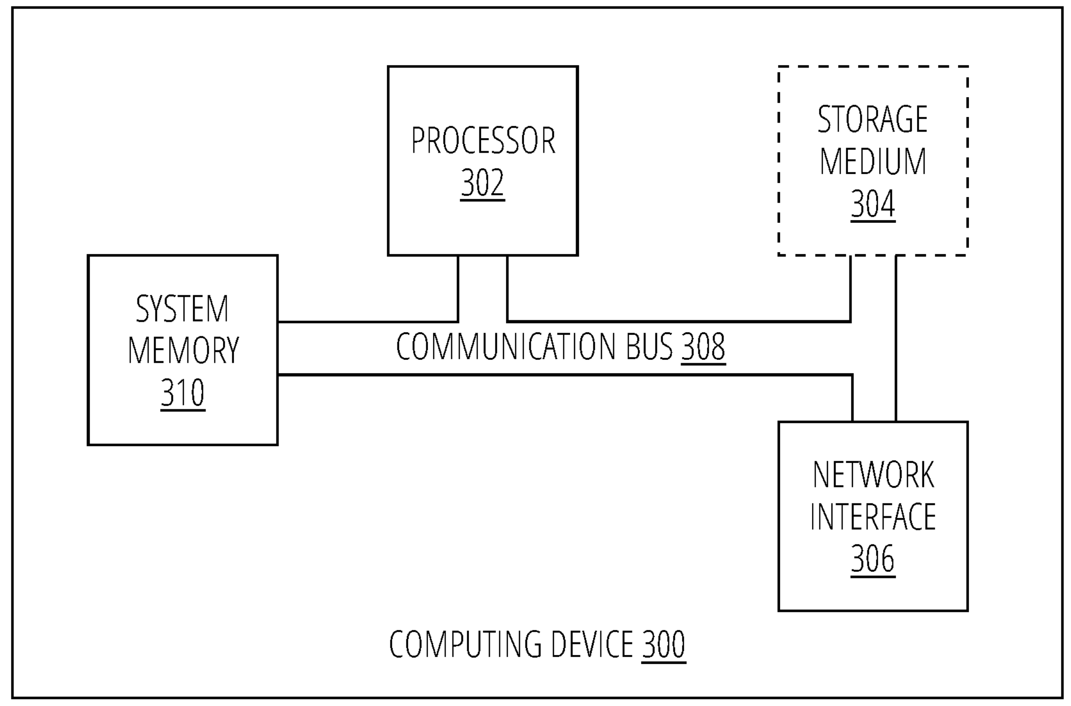
FIG. 3 is a block diagram that illustrates a non-limiting example embodiment of a computing device appropriate for use as a computing device with embodiments of the present disclosure.

FIG. 3 is a block diagram that illustrates aspects of an exemplary computing device 300 appropriate for use as a computing device of the present disclosure. While multiple different types of computing devices were discussed above, the exemplary computing device 300 describes various elements that are common to many different types of computing devices. While FIG. 3 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Some embodiments of a computing device may be implemented in or may include an application-specific integrated circuit (ASIC), a field-programmable gate array (FPGA), or other customized device. Moreover, those of ordinary skill in the art and others will recognize that the computing device 300 may be any one of any number of currently available or yet to be developed devices.

In its most basic configuration, the computing device 300 includes at least one processor 302 and a system memory 310 connected by a communication bus 308. Depending on the exact configuration and type of device, the system memory 310 may be volatile or nonvolatile memory, such as read only memory ("ROM"), random access memory ("RAM"), EEPROM, flash memory, or similar memory technology. Those of ordinary skill in the art and others will recognize that system memory 310 typically stores data and/or program modules that are immediately accessible to and/or currently being operated on by the processor 302. In this regard, the processor 302 may serve as a computational center of the computing device 300 by supporting the execution of instructions.

As further illustrated in FIG. 3, the computing device 300 may include a network interface 306 comprising one or more components for communicating with other devices over a network. Embodiments of the present disclosure may access basic services that utilize the network interface 306 to perform communications using common network protocols. The network interface 306 may also include a wireless network interface configured to communicate via one or more wireless communication protocols, such as Wi-Fi, 2G, 3G, LTE, WiMAX, Bluetooth, Bluetooth low energy, and/or the like. As will be appreciated by one of ordinary skill in the art, the network interface 306 illustrated in FIG. 3 may represent one or more wireless interfaces or physical communication interfaces described and illustrated above with respect to particular components of the computing device 300.

In the exemplary embodiment depicted in FIG. 3, the computing device 300 also includes a storage medium 304. However, services may be accessed using a computing device that does not include means for persisting data to a local storage medium. Therefore, the storage medium 304 depicted in FIG. 3 is represented with a dashed line to indicate that the storage medium 304 is optional. In any event, the storage medium 304 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

Suitable implementations of computing devices that include a processor 302, system memory 310, communication bus 308, storage medium 304, and network interface 306 are known and commercially available. For ease of illustration and because it is not important for an understanding of the claimed subject matter, FIG. 3 does not show some of the typical components of many computing devices. In this regard, the computing device 300 may include input devices, such as a keyboard, keypad, mouse, microphone, touch input device, touch screen, tablet, and/or the like. Such input devices may be coupled to the computing device 300 by wired or wireless connections including RF, infrared, serial, parallel, Bluetooth, Bluetooth low energy, USB, or other suitable connections protocols using wireless or physical connections. Similarly, the computing device 300 may also include output devices such as a display, speakers, printer, etc. Since these devices are well known in the art, they are not illustrated or described further herein.

FIG. 4 is a flowchart that illustrates a non-limiting example embodiment of a method of generating a presentation of an achievable eyebrow according to various aspects of the present disclosure. In the method 400, an eyebrow visualization computing system 210 determines an achievable eyebrow based on a bare eyebrow and capabilities of one or more selected cosmetic products, and generates the presentation of the achievable eyebrow.

From a start block, the method 400 proceeds to block 402, where an eyebrow visualization computing system 210 receives at least one face image of a subject. In some embodiments, the eyebrow visualization computing system 210 may capture the at least one face image using a camera, scanner, or other device included in the eyebrow visualization computing system 210. In some embodiments, the eyebrow visualization computing system 210 may receive the at least one face image from a separate camera, scanner, or other device via a communication interface 204.

Any suitable type of data may be received for the at least one face image of the subject. In some embodiments, the at least one face image may be one or more two-dimensional images captured with a conventional digital camera. In some embodiments, the at least one face image may be one or more three-dimensional images captured by a stereoscopic digital camera, a conventional digital camera augmented with a depth sensor, a laser scanner, a structured light camera system, or any other suitable device. In some embodiments, each image of the at least one face image may be separately captured. In some embodiments, the images of the at least one face image may be frames of a video received by the eyebrow visualization computing system 210.

At block 404, a feature detection engine 212 of the eyebrow visualization computing system 210 detects a position of the bare eyebrow in the at least one face image. In some embodiments, the feature detection engine 212 uses a machine learning model such as a convolutional neural network (or another type of machine learning model or another type of computer vision technique) to find the position of the bare eyebrow. In some embodiments, the feature detection engine 212 may use Dlib, CLM-framework, or other available feature detection libraries in order to detect the bare eyebrow in the at least one face image (and the other features as discussed below).

In some embodiments, the feature detection engine 212 may generate a mask, path, or other indication of the location of the bare eyebrow in the at least one face image. In some embodiments, the feature detection engine 212 may use depth information in at least one face image or may use more than one face image captured from different locations to build a 3-dimensional representation of the face and/or the position of the bare eyebrow, and so may construct a 3-dimensional mesh or other 3-dimensional representation of the position of the bare eyebrow. In some embodiments, the feature detection engine 212 may determine the 3-dimensional representation of the position of the bare eyebrow by applying a mathematical transformation to a 2-dimensional representation of the bare eyebrow.

Figure 5:
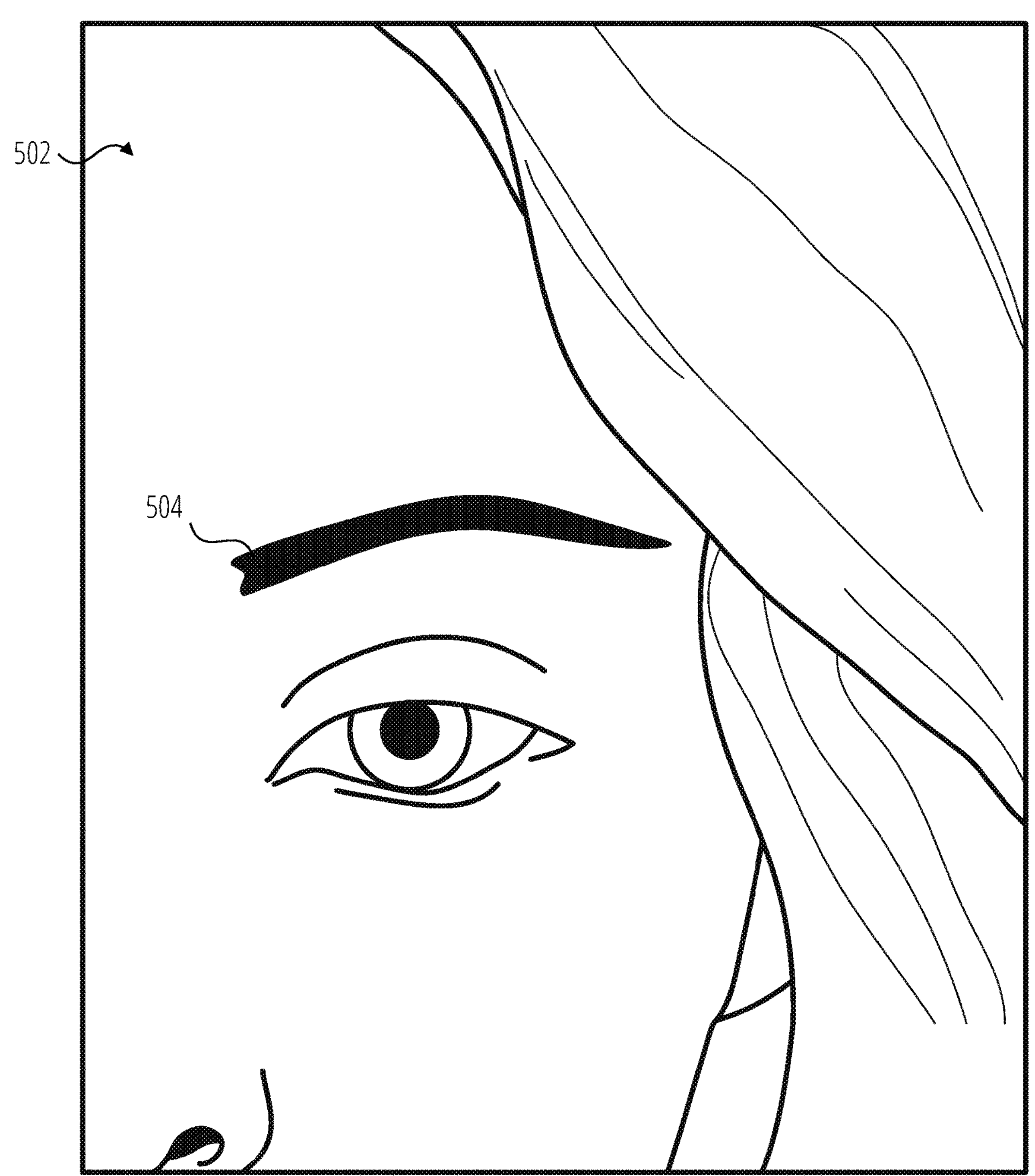
FIG. 5 is an illustration of a non-limiting example embodiment of an image of a face of a subject provided to an eyebrow visualization computing system according to various aspects of the present disclosure.

FIG. 5 is an illustration of a non-limiting example embodiment of a face image received by the eyebrow visualization computing system 210 according to various aspects of the present disclosure. In the illustrated face image, an upper left portion of the face of a subject 502 is shown, along with a left bare eyebrow 504. The position of the bare eyebrow 504 within the face image is detected at block 404. Though FIG. 5 (and the other illustrations within this disclosure) show only the upper left portion of the face of the subject 502 for the sake of clarity, in some embodiments larger (including but not limited to an upper half of both sides of the face or the entire face) or smaller (including but not limited to a smaller part of the upper portion of the face that still includes the features discussed herein) portions of the face of the subject 502 may be shown in the face image. In embodiments wherein both bare eyebrows are visible within the face image, the method 400 may operate on both bare eyebrows at once.

Returning to FIG. 4, at block 406, an eyebrow modification engine 214 of the eyebrow visualization computing system 210 receives an indication of an eyebrow mimetic. In some embodiments, the user interface engine 218 may present a set of images of celebrities, models, or other people with exemplary eyebrow styles, and the indication of the eyebrow mimetic may be provided by the subject selecting an image that includes their eyebrow mimetic. In some embodiments, the user interface engine 218 may present a set of illustrations of various examples of eyebrow mimetics, instead of images of actual people. In some embodiments, the set of images and/or illustrations may be stored in the eyebrow mimetic data store 208, and each image/illustration may be stored along with path, bitmap, mask, or other information defining a position of the associated eyebrow mimetic in the image/illustration. In some embodiments, the user interface engine 218 may receive an image including an eyebrow mimetic from the subject. In some embodiments, the feature detection engine 212 may be used to detect the position of the eyebrow mimetic within the indicated or received image. In some embodiments, the eyebrow mimetic may be determined based on a questionnaire or a recommendation algorithm. In some embodiments, the eyebrow mimetic may be a template with a certain style (angular, round, etc.), texture, and/or color.

At block 408, the feature detection engine 212 detects a position of one or more alignment features in the at least one face image. As discussed above, the feature detection engine 212 may use a convolutional neural network, a different type of machine learning technique, a different kind of computer vision technique, an available library, or any other suitable technique to find the alignment features.

Figure 6:
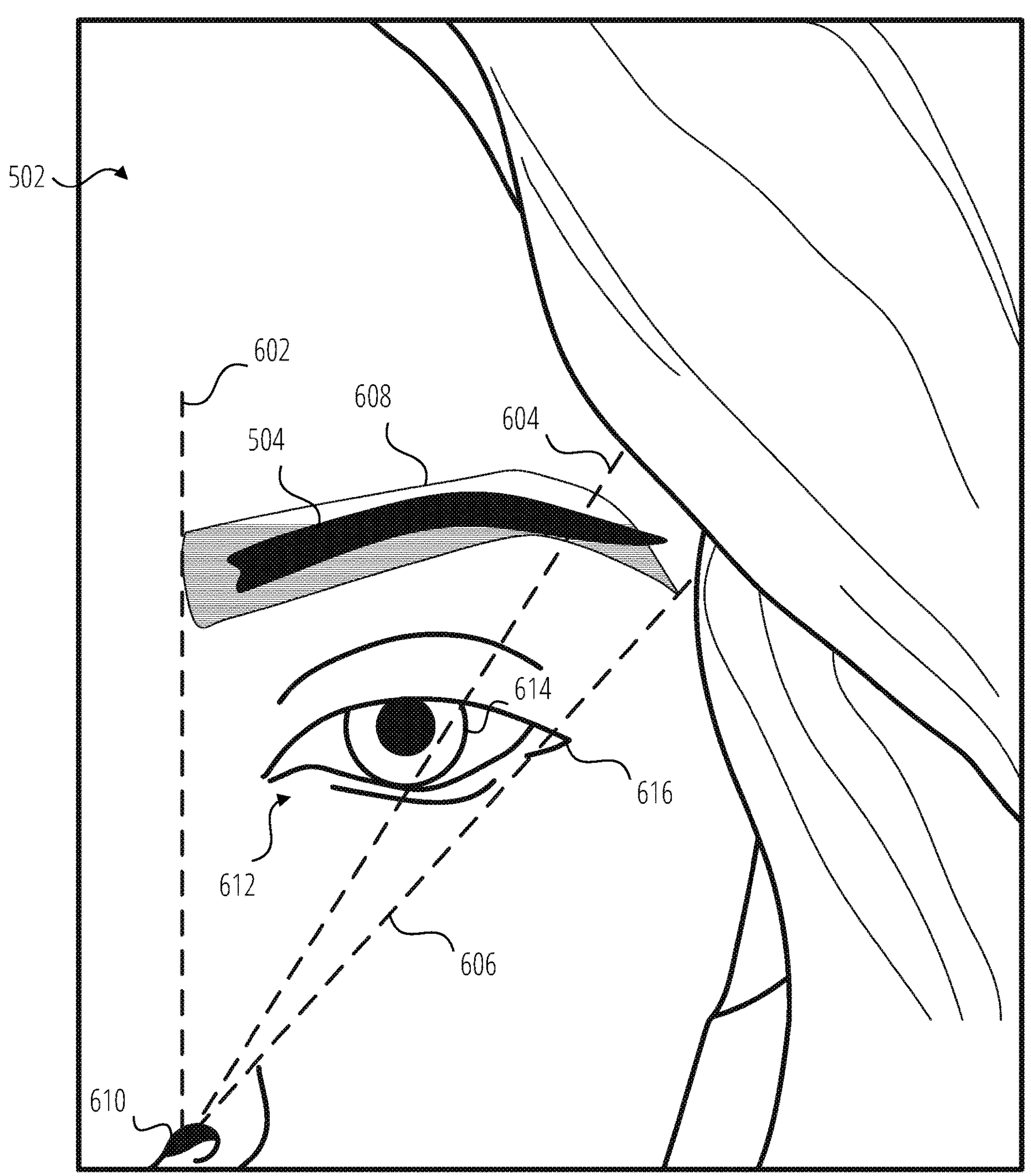
FIG. 6 is an illustration of a non-limiting example embodiment of positioning an eyebrow mimetic on a face of a subject according to various aspects of the present disclosure.

Alignment features are features of the face of the subject 502 that are used to position the eyebrow mimetic. FIG. 6 is an illustration of a non-limiting example embodiment of positioning of an eyebrow mimetic on a face image according to various aspects of the present disclosure. As shown, the alignment features are a nostril 610, an outer portion of an iris 614 of the eye 612, and a lateral canthus 616 of the eye 612. Though not illustrated in FIG. 6, an eyebrow ridge may also be used as an alignment feature.

Returning to FIG. 4, at block 410, the eyebrow modification engine 214 determines a position for the eyebrow mimetic based on the positions of the one or more alignment features. In some embodiments, the eyebrow modification engine 214 may use lines generated based on the alignment features for positioning the eyebrow mimetic. As shown in FIG. 6, a vertical line 602 is extended from the nostril 610 to establish an ideal location for a medial edge of the eyebrow mimetic 608, an iris line 604 is extended from the nostril 610 through the outer portion of the iris 614 to establish an ideal location for an arch of the eyebrow mimetic 608, and an eye corner line 606 is extended from the nostril 610 through the lateral canthus 616 to establish an ideal location for a lateral edge of the eyebrow mimetic 608. The eyebrow ridge may be used to establish an ideal vertical location for the eyebrow mimetic 608. In some embodiments, the lines are projected onto the face image regardless of the three-dimensional curve of the face in order to consider the appearance of the eyebrow from the front. In some embodiments, the lines may be drawn considering the three-dimensional curvature of the face.

Once the lines are established based on the alignment features, the eyebrow modification engine 214 may position the eyebrow mimetic 608 in order to minimize a total distance between each line and a corresponding landmark of the eyebrow mimetic 608 (e.g., a distance between the medial edge of the eyebrow mimetic 608 and the vertical line 602, a distance between the arch of the eyebrow mimetic 608 and the iris line 604, a distance between the lateral edge of the eyebrow mimetic 608 and the eye corner line 606, and a distance between the eyebrow mimetic 608 and the eyebrow ridge. In some embodiments, the eyebrow modification engine 214 may resize the eyebrow mimetic 608 in order to fit the eyebrow in the desired position. In some embodiments, the eyebrow modification engine 214 may consider an amount of overlap between the bare eyebrow 504 and the eyebrow mimetic 608 in determining the position for the eyebrow mimetic 608.

One will note that the specific alignment features and lines illustrated in FIG. 6 denote particular eyebrow style guidelines that are generally found desirable. In some embodiments, different eyebrow style guidelines may be used that use different alignment features and/or lines for positioning the eyebrow mimetic 608.

Returning to FIG. 4, at block 412, the eyebrow modification engine 214 determines maximum modification parameters based on characteristics of one or more products. In some embodiments, the user interface engine 218 may receive indications of one or more products, including but not limited to brushes, pencils, powders, waxes, and/or mascara, to be applied to change the shape of the bare eyebrow 504. Each product may be associated with maximum amounts that the product (or the product in combination with other products) can be used to enhance the appearance of the bare eyebrow 504, and this information may be stored in the product data store 220.

Figure 7:
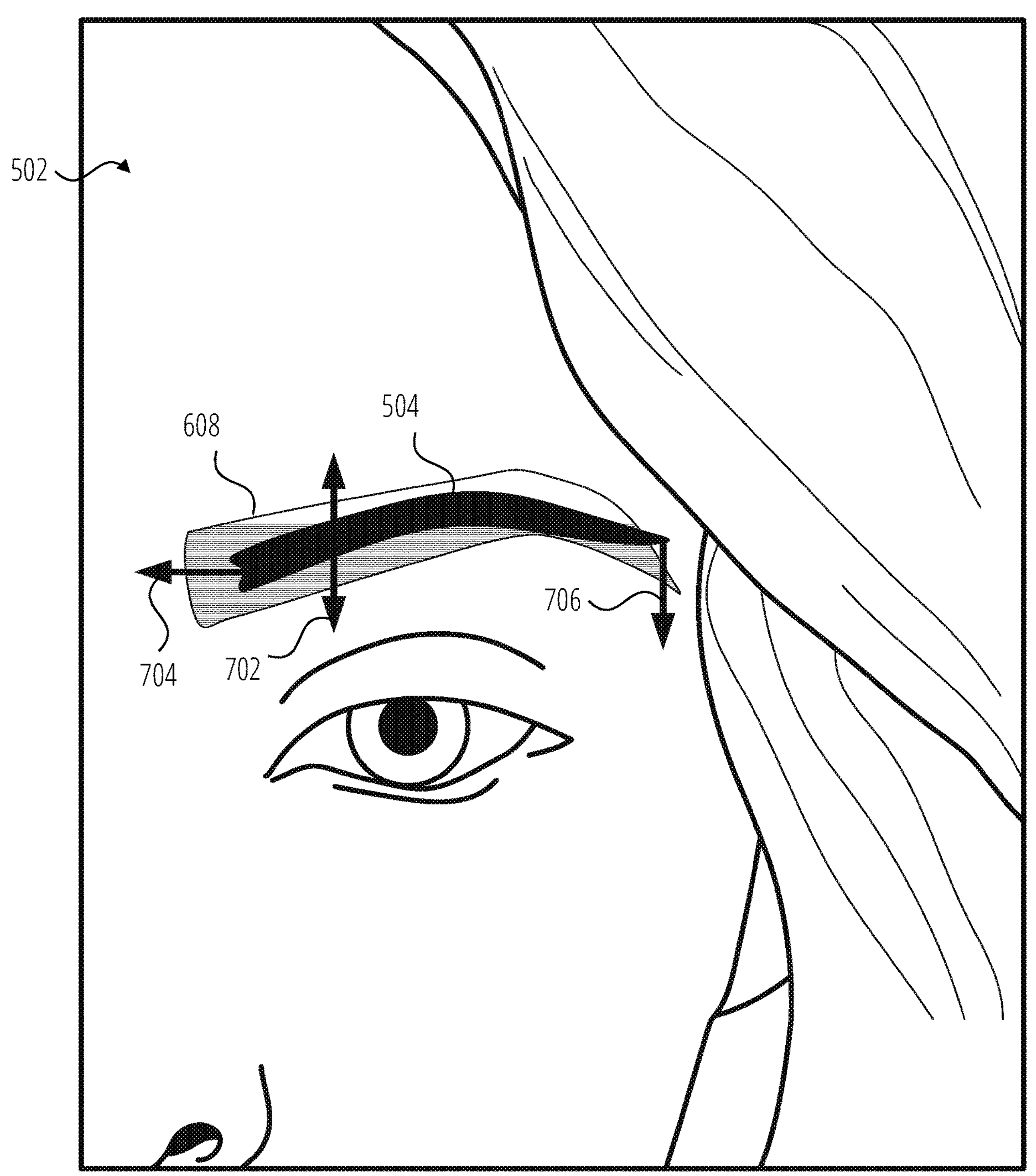
FIG. 7 is an illustration of a non-limiting example embodiment of modifications to an eyebrow mimetic to mimic an eyebrow mimetic according to various aspects of the present disclosure.

FIG. 7 is an illustration of a non-limiting example embodiment of maximum modification parameters according to various aspects of the present disclosure. As shown in FIG. 7, a maximum amount of a thickness adjustment 702 (a vertical thickness of the eyebrow), a maximum amount of a length adjustment 704 (a position of a medial or lateral end of the eyebrow), and a maximum amount of an arch adjustment 706 (an overall shape of the eyebrow) may be provided for each product or combination of products. In some embodiments, the maximum amounts may be determined empirically by using the products to increase the dimensions of one or more sample bare eyebrows and then obtaining ratings of whether or not the results are acceptable. In some embodiments, example products with known properties (such as viscosity, opacity, color, etc.) may have maximum amounts empirically determined, and these values may be inferred for other products with matching properties. In some embodiments, the maximum modification parameters may also include density changes.

In some embodiments, the maximum modification parameters may have separate values indicating an amount that a thickness, a length, and an arch may be increased versus an amount that the thickness, length, and arch may be decreased. For many products, a maximum decrease amount may be zero, as many products are usable to increase the size of the bare eyebrow. For some products (such as concealers), the maximum increase amount may be zero and the maximum decrease amount may be non-zero, though the maximum decrease amount is often small.

Returning to FIG. 4, at block 414, the eyebrow modification engine 214 determines an achievable eyebrow by modifying one or more of a length, an arch, and a thickness of the bare eyebrow within the maximum modification parameters to approach the eyebrow mimetic. In some embodiments, the eyebrow modification engine 214 modifies the length, arch, and/or thickness of the bare eyebrow in order to maximize an area of the eyebrow mimetic 608 covered by either the bare eyebrow 504 or by the product(s). In some embodiments, the eyebrow modification engine 214 modifies the length, arch, and/or thickness of the bare eyebrow 504 in order to minimize an overall distance between a border of the achievable eyebrow and a border of the eyebrow mimetic 608. In some embodiments, the eyebrow modification engine 214 modifies the length, arch, and/or thickness of the bare eyebrow 504 in order to minimize a difference in the shape of the achievable eyebrow and the eyebrow mimetic 608. In some embodiments, some combination of these (and/or other) metrics may be used to determine the shape of the achievable eyebrow. In some embodiments, the three-dimensional shape of the face is considered when determining the achievable eyebrow shape.

Figure 8:
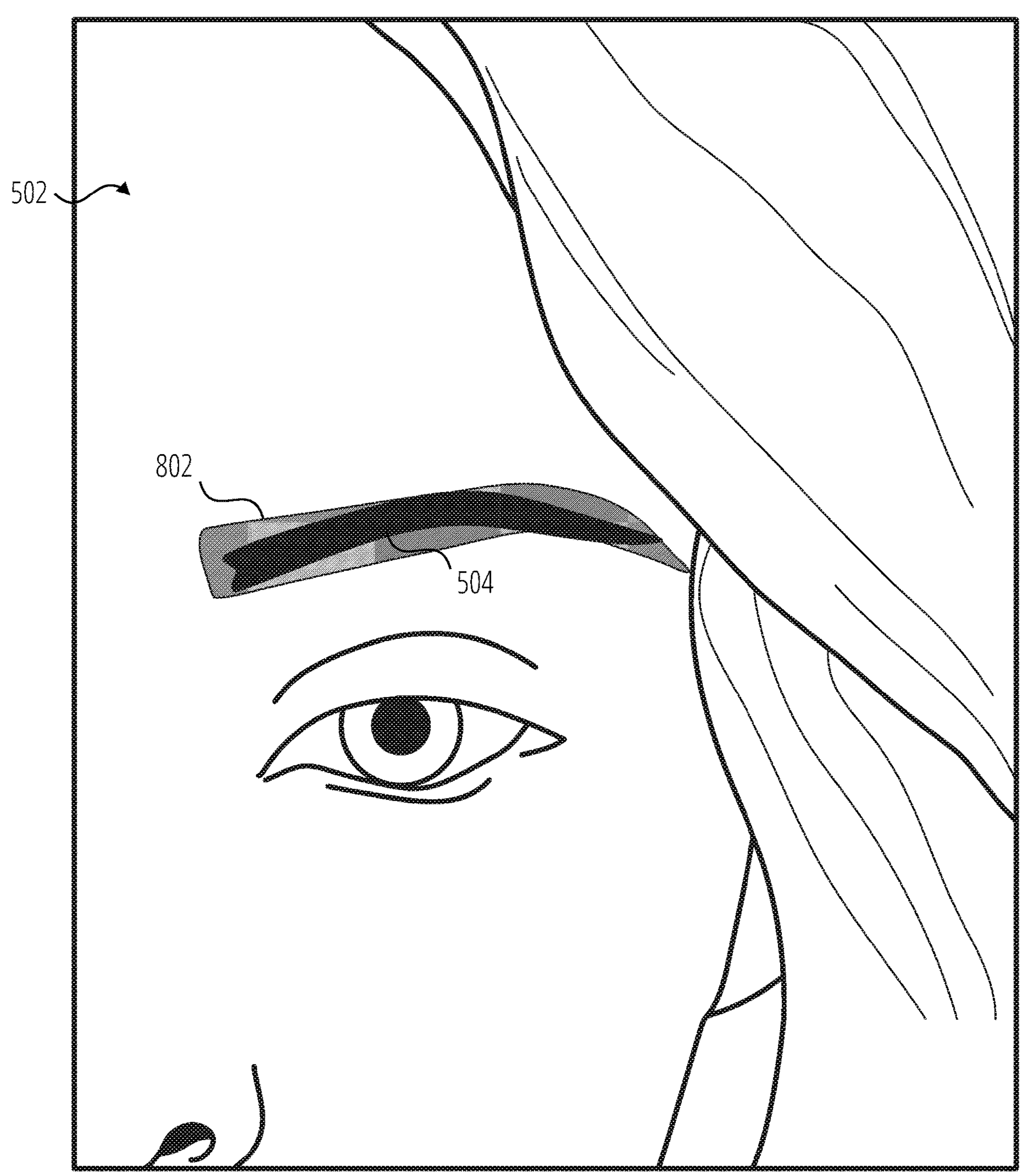
FIG. 8 is an illustration of a non-limiting example embodiment of a presentation of an achievable eyebrow on a face of a subject according to various aspects of the present disclosure.

At block 416, a presentation generation engine 216 of the eyebrow visualization computing system 210 generates a presentation of the achievable eyebrow. FIG. 8 is an illustration of a non-limiting example embodiment of a presentation of an achievable eyebrow according to various aspects of the present disclosure. In FIG. 8, the presentation generation engine 216 has generated a face image that shows the achievable eyebrow 802 superimposed over the bare eyebrow 504. Though the bare eyebrow 504 is visible in FIG. 8 for the sake of clarity, in some embodiments, the face image generated by the presentation generation engine 216 may superimpose the achievable eyebrow 802 over the bare eyebrow 504 in an opaque manner such that the end result of application of the products is apparent and can be evaluated by the subject 502.

In some embodiments, the presentation generation engine 216 may generate a digital image including the face image with the superimposed achievable eyebrow 802, and the digital image may be presented in any suitable manner, including but not limited to being presented via a digital display device such as a screen of a mobile device, desktop computing device, laptop computing device, web page, or any other digital display device, or via a hard copy display device such as a printer. In some embodiments, the presentation generation engine 216 may generate an augmented reality view of the subject 502 with the achievable eyebrow 802 superimposed over a live image of the subject 502, and may present the augmented reality view via a mobile device or any other suitable display device. In some embodiments, instead of superimposing the achievable eyebrow 802, the augmented reality view may include warping the presentation of the bare eyebrow or replacing the bare eyebrow. In some embodiments, the presentation generation engine 216 may provide the achievable eyebrow 802 as a pattern or other instruction for a makeup printing device, which may then be used to apply the products to the bare eyebrow 504 of the subject 502 to create the shape, color, and texture of the achievable eyebrow 802. In some embodiments, the presentation generation engine 216 may use the achievable eyebrow 802 to generate a custom stencil, a custom stamp, coaching instructions, or other artifacts that allow the subject to apply the achievable eyebrow 802.

Returning to FIG. 4, the method 400 then proceeds to an end block and terminates.

While illustrative embodiments have been illustrated and described, it will be appreciated that various changes can be made therein without departing from the spirit and scope of the invention.

Examples

1. A eyebrow generation system, comprising:
   - circuitry configured to predict static and dynamic information of a brow region of a subject and to determine one or more eyebrow characteristics for a subject based on one or more images or videos of the brow region of the subject;
   - circuitry configured to generate one or more digital instances of an eyebrow geometric shape, an eyebrow color, an eyebrow texture, or an eyebrow location based on the static and dynamic information of the brow region; and
   - circuitry configured to generate one or more digital instances of user-selectable modifications to the eyebrow geometric shape, the eyebrow color, the eyebrow texture, or the eyebrow location.

2. The eyebrow generation system of example 1, further comprising:
   - circuitry configured to exchange one or more eyebrow parameters with a real-time eyebrow deposition device.

3. The eyebrow generation system of example 1, wherein the one or more eyebrow parameters include eyebrow color parameters including one or more of eyebrow hue, eyebrow tint, eyebrow tone, and eyebrow shade parameters.

4. The eyebrow generation system of example 1, wherein the one or more eyebrow parameters include one or more eyebrow geometric shape parameters, eyebrow color parameters, eyebrow texture parameters, or eyebrow location parameters.

5. The eyebrow generation system of example 1, wherein the one or more eyebrow parameters include one or more eyebrow deposition parameters.

6. The eyebrow generation system of example 1, wherein the one or more eyebrow parameters include one or more user-selected modifications to the eyebrow geometric shape, the eyebrow color, the eyebrow texture, or the eyebrow location, or combinations thereof.

7. The eyebrow generation system of example 1, further comprising:

circuitry configured to generate eyebrow deposition parameters based on a user-selected eyebrow geometric shape, user-selected eyebrow color, user-selected eyebrow texture, or user-selected eyebrow location, or combinations thereof, the eyebrow deposition parameters including layer-by-layer material deposition parameters, cosmetic material deposition parameters, skincare formulation parameters, or combinations thereof.

8. The eyebrow generation system of example 1, further comprising:

circuitry configured to generate a digital image of at least one eyebrow within the brow region of the subject responsive to one or more inputs indicative of a user-selected modification.

9. The eyebrow generation system of example 1, further comprising:

circuitry configured to generate eyebrow positioning information and to generate a digital image of at least one eyebrow within the brow region of the subject.

10. A computer-implemented method of presenting an achievable eyebrow, the method comprising:

receiving, by a computing system, an indication of an eyebrow mimetic for a subject;

positioning, by the computing system, the eyebrow mimetic on an image of a face of the subject;

determining, by the computing system, an achievable eyebrow by determining one or more modifications to a bare eyebrow of the subject within maximum modification parameters to make the bare eyebrow more like the eyebrow mimetic; and generating, by the computing system, a presentation of the achievable eyebrow.

11. The computer-implemented method of example 10, wherein positioning the eyebrow mimetic on the image of the face of the subject includes detecting one or more alignment features in the image of the face of the subject.

12. The computer-implemented method of example 11, wherein the one or more alignment features include a nostril, an iris of an eye, an eyebrow ridge, and a lateral canthus of the eye; and wherein positioning the eyebrow mimetic on the image of the face of the subject includes positioning the eyebrow mimetic in a position wherein:

the eyebrow mimetic is vertically aligned with the eyebrow ridge, a medial edge of the eyebrow mimetic is aligned with a line extending vertically from the nostril, an arch of the eyebrow mimetic is aligned with a line extending from the nostril through the iris, and a lateral edge of the eyebrow mimetic is aligned with a line extending from the nostril through the lateral canthus of the eye.

13. The computer-implemented method of example 10, wherein determining one or more modifications to the bare eyebrow of the subject within the maximum modification parameters to make the bare eyebrow more like the eyebrow mimetic includes determining one or more of a change in length, a change in arch, and a change in thickness.

14. The computer-implemented method of example 10, wherein determining the achievable eyebrow includes determining the maximum modification parameters based on characteristics of one or more indicated cosmetic products.

15. The computer-implemented method of example 10, further comprising:

capturing, by the computing system, one or more images of the face of the subject; and detecting, by the computing system, the bare eyebrow in the one or more images of the face of the subject.

16. The computer-implemented method of example 15, wherein capturing the one or more images of the face of the subject includes at least one of:

capturing a two-dimensional video of the face of the subject; and capturing a three-dimensional image of the face of the subject.

17. The computer-implemented method of example 10, wherein generating the presentation of the achievable eyebrow includes at least one of:

generating an image of the face of the subject with the achievable eyebrow superimposed over the bare eyebrow;

generating an augmented reality view of the face of the subject with the achievable eyebrow superimposed over the bare eyebrow; and providing instructions to a makeup printer to apply the achievable eyebrow to the face of the subject.

18. A non-transitory computer-readable medium having instructions stored thereon that, in response to execution by one or more processors of a computing system, cause the computing system to perform actions comprising:

receiving, by the computing system, an indication of an eyebrow mimetic for a subject;

positioning, by the computing system, the eyebrow mimetic on an image of a face of the subject;

determining, by the computing system, an achievable eyebrow by determining one or more modifications to a bare eyebrow of the subject within maximum modification parameters to make the bare eyebrow more like the eyebrow mimetic; and generating, by the computing system, a presentation of the achievable eyebrow.

19. The computer-readable storage medium of example 18, wherein positioning the eyebrow mimetic on the image of the face of the subject includes detecting one or more alignment features in the image of the face of the subject;

wherein the one or more alignment features include a nostril, an iris of an eye, an eyebrow ridge, and a lateral canthus of the eye; and wherein positioning the eyebrow mimetic on the image of the face of the subject includes positioning the eyebrow mimetic in a position wherein:

the eyebrow mimetic is vertically aligned with the eyebrow ridge, a medial edge of the eyebrow mimetic is aligned with a line extending vertically from the nostril, an arch of the eyebrow mimetic is aligned with a line extending from the nostril through the iris, and a lateral edge of the eyebrow mimetic is aligned with a line extending from the nostril through the lateral canthus of the eye.

20. The computer-readable storage medium of example 18, wherein determining one or more modifications to the bare eyebrow of the subject within the maximum modification parameters to make the bare eyebrow more like the eyebrow mimetic includes determining one or more of a change in length, a change in arch, and a change in thickness.

21. The computer-readable storage medium of example 18, wherein determining the achievable eyebrow includes determining the maximum modification parameters based on characteristics of one or more indicated cosmetic products.

22. The computer-readable storage medium of example 18, wherein the actions further comprise:

capturing, by the computing system, one or more images of the face of the subject; and detecting, by the computing system, the bare eyebrow in the one or more images of the face of the subject;

wherein capturing the one or more images of the face of the subject includes at least one of:

capturing a two-dimensional video of the face of the subject; and capturing a three-dimensional image of the face of the subject.

23. The computer-readable storage medium of example 18, wherein generating the presentation of the achievable eyebrow includes at least one of:

generating an image of the face of the subject with the achievable eyebrow superimposed over the bare eyebrow;

generating an augmented reality view of the face of the subject with the achievable eyebrow superimposed over the bare eyebrow; and providing instructions to a makeup printer to apply the achievable eyebrow to the face of the subject.

24. A system comprising:

circuitry for receiving an indication of an eyebrow mimetic for a subject;

circuitry for positioning the eyebrow mimetic on an image of a face of the subject;

circuitry for determining an achievable eyebrow by determining one or more modifications to a bare eyebrow of the subject within maximum modification parameters to make the bare eyebrow more like the eyebrow mimetic; and circuitry for generating a presentation of the achievable eyebrow.

25. The system of example 24, wherein positioning the eyebrow mimetic on the image of the face of the subject includes detecting one or more alignment features in the image of the face of the subject;

wherein the one or more alignment features include a nostril, an iris of an eye, an eyebrow ridge, and a lateral canthus of the eye; and wherein positioning the eyebrow mimetic on the image of the face of the subject includes positioning the eyebrow mimetic in a position wherein:

the eyebrow mimetic is vertically aligned with the eyebrow ridge, a medial edge of the eyebrow mimetic is aligned with a line extending vertically from the nostril, an arch of the eyebrow mimetic is aligned with a line extending from the nostril through the iris, and a lateral edge of the eyebrow mimetic is aligned with a line extending from the nostril through the lateral canthus of the eye.

26. The system of example 24, wherein determining one or more modifications to the bare eyebrow of the subject within the maximum modification parameters to make the bare eyebrow more like the eyebrow mimetic includes determining one or more of a change in length, a change in arch, and a change in thickness.

27. The system of example 24, wherein determining the achievable eyebrow includes determining the maximum modification parameters based on characteristics of one or more indicated cosmetic products.

28. The system of example 24, further comprising:

capturing one or more images of the face of the subject; and detecting the bare eyebrow in the one or more images of the face of the subject;

wherein capturing the one or more images of the face of the subject includes at least one of:

capturing a two-dimensional video of the face of the subject; and capturing a three-dimensional image of the face of the subject.

29. The system of example 24, wherein generating the presentation of the achievable eyebrow includes at least one of:

generating an image of the face of the subject with the achievable eyebrow superimposed over the bare eyebrow;

generating an augmented reality view of the face of the subject with the achievable eyebrow superimposed over the bare eyebrow; and providing instructions to a makeup printer to apply the achievable eyebrow to the face of the subject.

The invention claimed is:

1. A computer-implemented method of presenting an achievable eyebrow, the method comprising:

receiving, by a computing system, an indication of an eyebrow mimetic for a subject;

positioning, by the computing system, the eyebrow mimetic on an image of a face of the subject;

determining, by the computing system, an achievable eyebrow by determining one or more modifications to a bare eyebrow of the subject within maximum modification parameters to make the bare eyebrow more like the eyebrow mimetic; and generating, by the computing system, a presentation of the achievable eyebrow;

wherein determining the achievable eyebrow includes determining the maximum modification parameters based on maximum amounts for which one or more indicated cosmetic products can be used to enhance the appearance of the bare eyebrow without appearing unnatural.

2. The computer-implemented method of claim 1, wherein positioning the eyebrow mimetic on the image of the face of the subject includes detecting one or more alignment features in the image of the face of the subject.

3. The computer-implemented method of claim 2, wherein the one or more alignment features include a nostril, an iris of an eye, an eyebrow ridge, and a lateral canthus of the eye; and wherein positioning the eyebrow mimetic on the image of the face of the subject includes positioning the eyebrow mimetic in a position wherein:

the eyebrow mimetic is vertically aligned with the eyebrow ridge, a medial edge of the eyebrow mimetic is aligned with a line extending vertically from the nostril, an arch of the eyebrow mimetic is aligned with a line extending from the nostril through the iris, and a lateral edge of the eyebrow mimetic is aligned with a line extending from the nostril through the lateral canthus of the eye.

4. The computer-implemented method of claim 1, wherein determining one or more modifications to the bare eyebrow of the subject within the maximum modification parameters to make the bare eyebrow more like the eyebrow mimetic includes determining one or more of a change in length, a change in arch, and a change in thickness.

5. The computer-implemented method of claim 1, further comprising:

capturing, by the computing system, one or more images of the face of the subject; and detecting, by the computing system, the bare eyebrow in the one or more images of the face of the subject.

6. The computer-implemented method of claim 5, wherein capturing the one or more images of the face of the subject includes at least one of:

capturing a two-dimensional video of the face of the subject; and capturing a three-dimensional image of the face of the subject.

7. The computer-implemented method of claim 1, wherein generating the presentation of the achievable eyebrow includes at least one of:

generating an image of the face of the subject with the achievable eyebrow superimposed over the bare eyebrow;

generating an augmented reality view of the face of the subject with the achievable eyebrow superimposed over the bare eyebrow; and providing instructions to a makeup printer to apply the achievable eyebrow to the face of the subject.

8. The computer-implemented method of claim 1, wherein the maximum amounts for which the one or more indicated cosmetic products can be used to enhance the appearance of the bare eyebrow without appearing unnatural are inferred based on one or more of a viscosity, an opacity, or a color of each of the one or more indicated cosmetic products.

9. The computer-implemented method of claim 1, wherein the maximum modification parameters include one or more of a maximum amount of a thickness adjustment, a maximum amount of a length adjustment, a maximum amount of an arch adjustment, and a maximum amount of a density adjustment.

10. The computer-implemented method of claim 1, wherein the one or more indicated cosmetic products include one or more of a pencil, a powder, a wax, a mascara, or a concealer.

11. A non-transitory computer-readable medium having instructions stored thereon that, in response to execution by one or more processors of a computing system, cause the computing system to perform actions comprising:

receiving, by the computing system, an indication of an eyebrow mimetic for a subject;

positioning, by the computing system, the eyebrow mimetic on an image of a face of the subject;

determining, by the computing system, an achievable eyebrow by determining one or more modifications to a bare eyebrow of the subject within maximum modification parameters to make the bare eyebrow more like the eyebrow mimetic; and generating, by the computing system, a presentation of the achievable eyebrow;

wherein determining the achievable eyebrow includes determining, by the computing system, the maximum modification parameters based on maximum amounts for which one or more indicated cosmetic products can be used to enhance the appearance of the bare eyebrow without appearing unnatural.

12. The computer-readable storage medium of claim 11, wherein positioning the eyebrow mimetic on the image of the face of the subject includes detecting one or more alignment features in the image of the face of the subject.

13. The computer-readable storage medium of claim 12, wherein the one or more alignment features include a nostril, an iris of an eye, an eyebrow ridge, and a lateral canthus of the eye; and wherein positioning the eyebrow mimetic on the image of the face of the subject includes positioning the eyebrow mimetic in a position wherein:

the eyebrow mimetic is vertically aligned with the eyebrow ridge, a medial edge of the eyebrow mimetic is aligned with a line extending vertically from the nostril, an arch of the eyebrow mimetic is aligned with a line extending from the nostril through the iris, and a lateral edge of the eyebrow mimetic is aligned with a line extending from the nostril through the lateral canthus of the eye.

14. The computer-readable storage medium of claim 11, wherein determining one or more modifications to the bare eyebrow of the subject within the maximum modification parameters to make the bare eyebrow more like the eyebrow mimetic includes determining one or more of a change in length, a change in arch, and a change in thickness.

15. The computer-readable storage medium of claim 11, wherein the actions further comprise:

capturing, by the computing system, one or more images of the face of the subject; and detecting, by the computing system, the bare eyebrow in the one or more images of the face of the subject;

wherein capturing the one or more images of the face of the subject includes at least one of:

capturing a two-dimensional video of the face of the subject; and capturing a three-dimensional image of the face of the subject.

16. The computer-readable storage medium of claim 11, wherein generating the presentation of the achievable eyebrow includes at least one of:

generating an image of the face of the subject with the achievable eyebrow superimposed over the bare eyebrow;

generating an augmented reality view of the face of the subject with the achievable eyebrow superimposed over the bare eyebrow; and providing instructions to a makeup printer to apply the achievable eyebrow to the face of the subject.

17. The non-transitory computer-readable medium of claim 11, wherein the maximum amounts for which the one or more indicated cosmetic products can be used to enhance the appearance of the bare eyebrow without appearing unnatural are inferred based on one or more of a viscosity, an opacity, or a color of each of the one or more indicated cosmetic products.

18. The non-transitory computer-readable medium of claim 11, wherein the maximum modification parameters include one or more of a maximum amount of a thickness adjustment, a maximum amount of a length adjustment, a maximum amount of an arch adjustment, and a maximum amount of a density adjustment.

* * * * *